(12) United States Patent
Simon

(10) Patent No.: US 6,439,672 B1
(45) Date of Patent: Aug. 27, 2002

(54) VEHICLE LIGHT WEIGHT DEAD AXLE AND METHOD FOR FORMING SAME

(75) Inventor: Brian A. Simon, Grosse Pointe Park, MI (US)

(73) Assignee: U.S. Manufacturing Corporation, Fraser, MI (US)

( * ) Notice: Subject to any disclaimer, the term of this patent is extended or adjusted under 35 U.S.C. 154(b) by 0 days.

(21) Appl. No.: 09/658,725

(22) Filed: Sep. 11, 2000

(51) Int. Cl.[7] ................................................ B60B 35/00
(52) U.S. Cl. ..................................... 301/124.1; 301/131
(58) Field of Search ............................. 301/124.1, 125, 301/126, 129, 131, 132, 127

(56) References Cited

U.S. PATENT DOCUMENTS

| | | | | |
|---|---|---|---|---|
| 760,505 A | * | 5/1904 | Wilcox | 301/126 |
| 1,169,642 A | * | 1/1916 | Heeter | 301/124.1 |
| 1,592,755 A | * | 7/1926 | Bugatti | 301/124.1 |
| 1,873,453 A | * | 8/1932 | Mogford et al. | 301/124.1 |
| 1,964,258 A | * | 6/1934 | Graham | 301/132 |
| 2,019,811 A | * | 11/1935 | Graham | 301/132 |
| 2,044,389 A | * | 6/1936 | Kay | 301/124.1 |
| 2,133,091 A | * | 10/1938 | Gettig | 301/124.1 |
| 2,165,472 A | * | 7/1939 | Friedman | 301/124.1 |
| 2,611,656 A | * | 9/1952 | Vanderberg | 301/124.1 |
| 2,625,055 A | * | 1/1953 | Cudy | 301/124.1 |
| 4,986,608 A | * | 1/1991 | Fett | 301/137 |
| 5,281,005 A | * | 1/1994 | Babcock et al. | 301/124.1 |
| 5,855,416 A | * | 1/1999 | Tasker et al. | 301/124.1 |

* cited by examiner

Primary Examiner—S. Joseph Morano
Assistant Examiner—Long Bao Nguyen
(74) Attorney, Agent, or Firm—Harness, Dickey & Pierce, P.L.C.

(57) ABSTRACT

A vehicle dead axle is formed of a hollow tube that extends substantially the width of the vehicle and has wheel supporting spindle portions welded upon the opposite ends of the tube. The exterior surface of the tube is generally circular in cross-section. The cross-sectional shape of the opening in the tube is asymmetrically curved relative to the central axis of the tube to form the tube into integral, longitudinally extending, circumferential wall segments of varying wall thicknesses. The axle is oriented so that its thicker wall segments receive the greater of anticipated forces imposed upon the axle during use. The axle is formed by placing a tubular blank within an open die having a die throat and pushing the blank through the die throat by means of a moving ram that engages and pushes against the end of the blank. The ram has an extension that is fitted within the blank as the ram pushes the blank through the space between the extension and the die throat. The extension is asymmetrically shaped in cross section relative to the axis of the throat so as to form the varying thickness circumferential wall segments.

17 Claims, 3 Drawing Sheets

VEHICLE LIGHT WEIGHT DEAD AXLE AND METHOD FOR FORMING SAME

BACKGROUND OF INVENTION

This invention relates to a dead axle which is particularly useful for mounting the wheels beneath a truck drawn trailer and similar vehicles where the axles are not powered nor arranged to turn relative to the direction of movement of the vehicle.

Truck drawn trailers are supported upon wheels which are mounted upon dead axles that are fastened beneath, and extend the width of, the vehicle. The opposite ends of the such axles are formed with spindles or hubs upon which the wheels are mounted. On large vehicles, such as long trailers, where there are a number of axles and a large number of wheels, the axles add considerable weight to the vehicle. Thus, it would be useful to provide a dead axle which, although heavy enough and strong enough to support large loads, is nevertheless relatively light in weight.

Light weight axles and light weight drive shafts have been manufactured in the past by an extrusion process that, in essence, comprises extruding a tubular blank through a die throat by means of a ram or pusher punch. The punch pushes the blank in an axial direction through the die throat Typically, the punch is formed with forward extensions, like mandrels, which are located within the blank and within the die throat during the extrusion of the blank. Thus, depending upon the locations and diameters of the extensions, some portions of the wall thickness of the extruded tube are made thicker than other portions. The different wall thicknesses are produced by the radial dimensions of the annular spaces located between the extensions and the die throat.

The extrusion process may be performed with the blanks at room temperature or heated to facilitate the flow of the blank metal during the extrusion steps. Examples of this form of process for manufacturing light weight axles or drive shafts for vehicles are disclosed in U.S. Pat. No. 4,292,831 issued Oct. 6, 1981 to Joseph A. Simon for "A process for extruding a metal tube with inwardly thickened portions"; U.S. Pat. No. 5, 105,644 issued Apr. 21, 1992 to Joseph A. Simon for a "Light weight drive shaft"; U.S. Pat. No. 5,241,848 issued Sep. 7, 1993 to Joseph A. Simon for a "Light weight drive shaft"; U.S. Pat. No. 5,320,580 issued Jun. 14, 1994 to Joseph A. Simon for a "Light weight drive shaft"; and U.S. Pat. No. 5,522,246 issued Jun. 4, 1996 to Norina A. Simon for a "Process for forming light-weight tubular axles".

U.S. Pat. No. 5,522,246 describes a process within which a portion of a light weight axle is formed with an opening that is substantially elliptical in cross section. This produces an area along the length of the axle whose wall thicknesses vary from thick to thin, thereby reducing weight in some of the areas where a greater wall thickness is not needed for strength purposes.

The present invention is concerned with an improved process that is somewhat similar to the previously mentioned processes, but wherein the axle is provided with an elongated central section whose wall thickness varies considerably in cross section, so as to provide greater strengthened longitudinally extending wall segments where needed for high load absorption, and with the opposite ends of the tubular central section attached to separately formed spindles for mounting supporting wheels. The central section may be horizontally oriented to accommodate and absorb high applied loads while the overall weight of the axle may be reduced.

SUMMARY OF INVENTION

This invention contemplates a dead axle and a method of making a dead axle which comprises an elongated tube which is normally arranged in a horizontal position, spanning the width of a vehicle, such as a trailer or truck-tractor or other such vehicle, upon which wheels may be mounted. The axle is formed, of an elongated extruded tube having a center portion and two opposite end portions. The center portion, has a uniform exterior cross section throughout its length, and an interior opening whose cross-section is asymmetrical relative to the longitudinal axis of the tube. The end portions preferably are formed with circular cross-section openings to provide approximately circular end faces on the opposite ends of the tube.

The asymmetrical interior opening may be formed, in cross section, in different asymmetrical shapes, such as an off-center elliptical or approximately elliptical shape, an asymmetrical elliptical cross sectional shape wherein the opposite minor radii of the elliptical shape are of different lengths to provide different arcs, or an epicycloid or hypocycloid shape or a shape formed of different radii arcs joined end-to-end. Depending upon the cross-sectional shape of the opening, the wall thickness of the central portion of the dead axle, may be varied considerably to provide sufficient strength to support the anticipated loads. By making the wall thickness variable, theoretical, elongated wall segments are formed along the length of the axle which may be oriented to support the anticipated maximum forces that may be applied in pre-determined directions when the axle is mounted beneath the vehicle.

The opposite end portions provide generally circular in cross section, annular faces which are attached to separately formed spindles. The spindles have free spindle or hub ends upon which the wheels are mounted. The annular faces are arranged in face-to-face contact with the respective tube ends and are welded thereto.

The method for making the tubular center portion of the axle, generally comprises first preparing tubular blanks. These blanks are placed within a circular die having a constricted die throat. A ram or pusher punch engages the end of the blank which is remote from the throat and pushes the blank in an axial direction through the throat. The throat is smaller in diameter than the blank, so that the blank is extruded through the throat. The pusher punch or ram is provided with one or more extensions which, like mandrels, extend into the central opening of the tubular blank and are positioned within the die throat during the extrusion. Thus, the space between the exterior surfaces of the extensions and the interior surface of the circular die throat form an annular space through which the tube is extruded.

Preferably, at least one extension is provided with a cross sectional shape that is asymmetrical, such as non-circular, when the particular extension portion is within the confines of the die throat. That forms an asymmetrical shaped opening in the extrusion, relative to the longitudinal axis of the extrusion. The extension may be formed with an additional extension, which is circular in cross section and which, when positioned within the die throat during the extrusion of the blank, forms the opposite, circular ends of the tube. When the tube is fully extruded, it is contemplated that the separately formed spindle ends will be applied against the opposite ends of the tube and welded thereto to form the complete dead axle. In addition, it is contemplated to provide markers within the tube during the extrusion, to enable the user to properly orient the tube thicker and thinner portions relative to the vehicle and the spindles.

A major object of this invention is to provide a lighter weight dead axle which has integral thicker and thinner longitudinally extending wall segments running along its length and with one or more of the thicker segments being formed for absorption of larger loads than the thinner segments. By orienting the axle relative to the amount and direction of anticipated heavy loads, the axle has sufficient strength. Meanwhile, the axle wall is thinner and, therefore, lighter in those areas that are not subjected to the heavy load.

A further object of this invention is to provide a method for forming a dead axle with an extruded major center portion having thicker and thinner longitudinally extending wall segments and opposite spindle ends secured together to enable the formation of lighter weight axle portions between the opposite spindle ends so as to reduce the overall weight of the axle.

Still a further object of this invention is to provide a light weight axle whose major center portion is formed with multiple thicker integral segments, running almost the full length of the axle, for the absorption of anticipated heavy loads that are generally directionally applied.

These and other objects of this invention will become apparent upon reading the following description, of which the attached drawings form a part.

DETAILED DESCRIPTION

Figure 1:
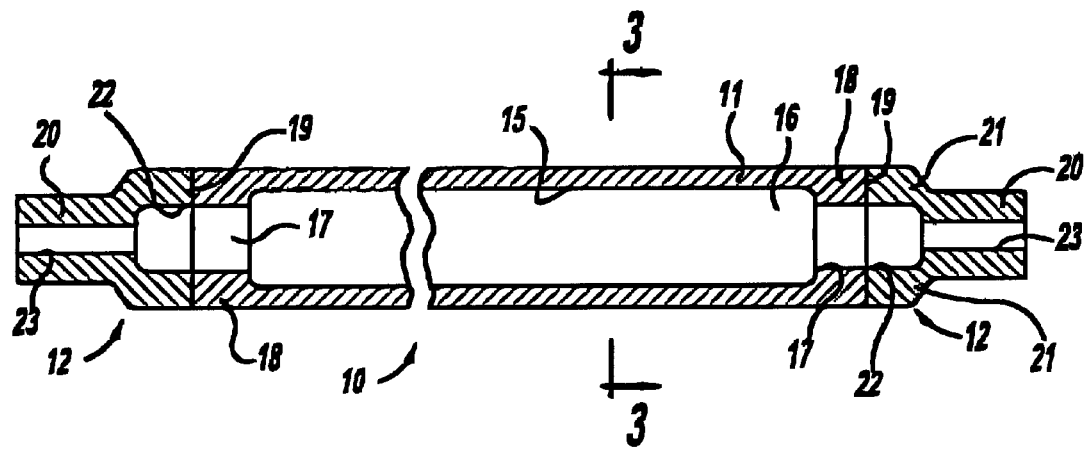
FIG. 1 is a cross sectional view of an assembled dead axle, with the opposite end spindles shown schematically.
Figure 2:
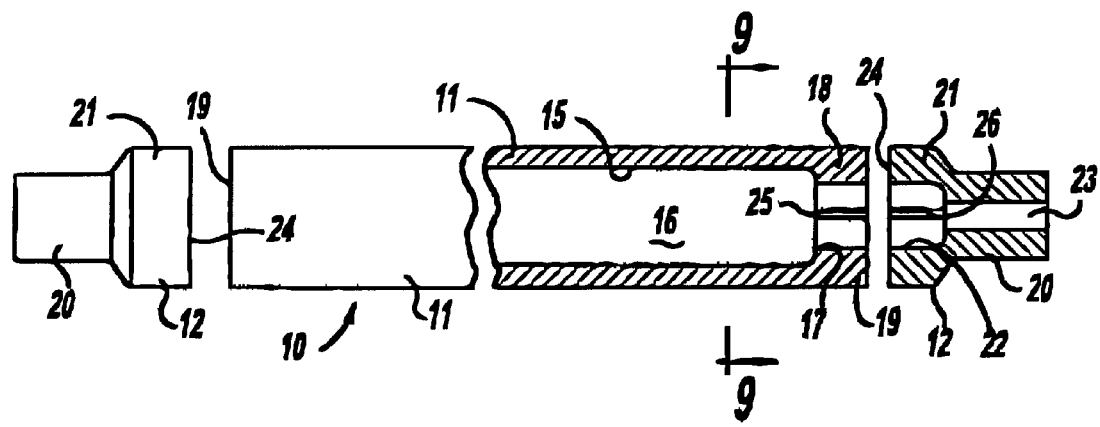
FIG. 2 is a disassembled, partially cross-sectioned view of the dead axnle.

FIGS. 1 and 2 schematically illustrate a non-rotatable or dead axle 10. The axle comprises three major parts, namely, a central extruded tubular part 11 and two end spindles 12 attached to the opposite ends of the tubular central part.

The tubular central part 11 has an opening 15 extending throughout its length. The opening is provided with a central portion 16 which is of an asymmetrical cross-section. The opening central portion stops a short distance from the opposite ends of the tube and is then continued by circular cross-section openings 17 which are of a smaller diameter than the opening portion 16. The opposite ends, of the tubular part 11 with the smaller diameter openings, provide thickened end portions 18 which are circular and have annular circular end faces 19.

The spindles 12 are separately formed by conventional casting or forging or machining metal. Each has a free hub or spindle end portion 20 which is shaped and sized to receive the parts that mount the wheel on the axle. The spindle also has an inner circular or annular end which has a central hole 22 and a hole continuation 23 which are aligned with the opening 17 formed in the tube 11. Thus, the spindle inner circular end 21 is provided with an inner face 24 which is annular in shape and sized to abut, in face-to-face contact, the annular end face 19 formed on the adjacent end of the tube 11. The adjacent annular ends of the spindles and of the tube are welded together to form a unitary axle construction.

Preferably, an extruded rib 25 is formed at each end of the tubular part, within the circular thickened end portion 18. A corresponding rib or similar marker 26 is formed in each of the spindles to match and abut the rib in the tube (see FIGS. 2 and 10). Thus, the parts can be properly aligned for assembly. Other types of markers can be used to orient the parts relative to each other and to the vehicle upon which the axle is mounted.

In manufacturing the product, the tubular central portion is produced from a tubular blank 28 which is extruded through a die 30. FIG. 11 schematically illustrates the die and the steps in the extrusion of the blank through the die. Thus, the die 30 is provided with a die opening 31 into which the blank may be inserted and a die throat 32 through which the blank is extruded.

A ram 35 or punch is arranged to push the blank through the die. The ram comprises a body 36 which fits into the die opening 31. The body has a first extension 37, which has a smaller diameter than the body, and a second or forward extension 38 which is even of a smaller diameter. A marker forming groove 39 may be formed in the forward extension for extruding the marker rib 25.

The intersection between the first extension 37 and the punch body 36 provides an annular shoulder 40 which is arranged to abut and push the tubular blank 28 through the die.

Figure 3:
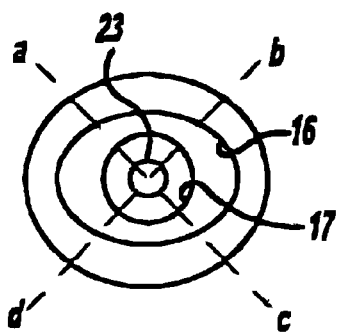
FIG. 3 is a cross sectional view taken in the direction of arrows 3—3 of FIG. 1.
Figure 4:
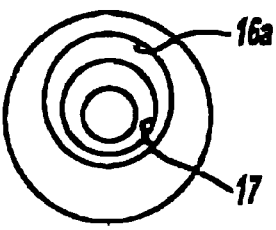
FIG. 4 shows a first modification of the cross-section of the opening through the axle shown in the direction of arrows 3—3 of FIG. 1.
Figure 5:
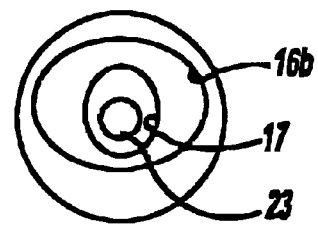
FIG. 5 illustrates another modification in the cross section of the opening through the axle shown in the direction of arrows 3—3 of FIG. 1.
Figure 6:
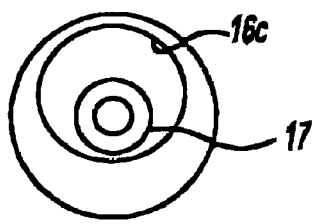
FIG. 6 shows another modification of the cross section of the axle opening shown in the direction of arrows 3—3 of FIG. 1.
Figure 7:
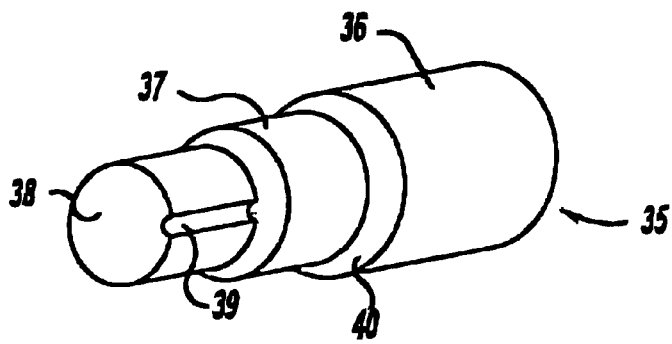
FIG. 7 is a perspective end and side view of the ram or punch.
Figure 8:
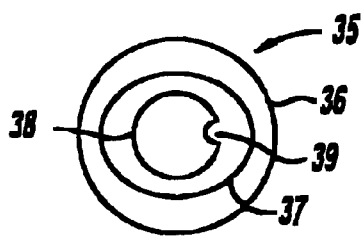
FIG. 8 is an end view of the ram taken in the direction of arrows 9—9 of FIG. 8.
Figure 9:
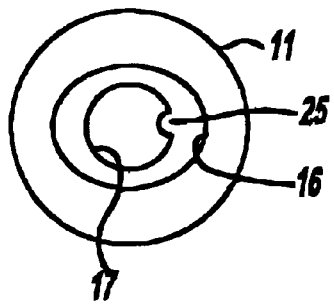
FIG. 9 is a cross sectional view taken in the direction of the arrows 10—10 of FIG. 1.

The first extension 37 is formed with an asymmetrical exterior peripheral surface. Preferably the forward extension 38 is formed in a circular cross sectional shape. Thus, the forward extension 38 is co-axial with the body 36 of the ram 35. However, the first extension 37 may be either laterally off-set, that is, not co-axially aligned, relative to the axis of the ram or may be formed with its outer periphery having different arcuate shapes connected together end-to-end. Some of the arcuates shapes may be of infinite radius, e.g. substantially flat, and others being of varying radii. The different shapes produce, during the extrusion, various cross-sectional shapes as are indicated, for example, in FIGS. 2–7. By way of example, the extension 37 may be oval or approximately elliptical in cross section as shown in FIG. 3. This will produce wall thicknesses which vary from thick to thin in the cross section of the wall forming tubular portion. Alternatively, the extension 37 may be substantially circular in cross section, but laterally offset relative to the axis of the ram so that it produces an offset opening 16a that provides varying thickness' in the wall sections as shown in FIG. 4. FIG. 5 illustrates an elliptical shaped opening 16b which is laterally offset from the axis of the tube. FIG. 6 illustrates a cross section shape opening 16c produced by an extension which is oval or nearly elliptical, that is, its minor radii are of different lengths so that in appearance it is somewhat egg shaped.

In each instance, as can be seen in the cross sections in FIGS. 3–6, and illustrated by the dotted lines, a, b, c, and d (see FIG. 3) the different cross sectional shape openings form integral thick and thin segments that extend longitudinally, that is, along the length of the tube.

By conventional mathematical analysis and calculations, the anticipated loads to be applied to the axle when it is assembled beneath a vehicle can be determined. Similarly, the force vectors of the applied force can be determined. Thus, the shaft can be oriented in such a way that its thicker, longitudinal segments are located in a way that better absorbs the loads applied, including compression and tensions stresses resulting from the loads. The thinner segments of the walls of the tubes can be oriented in directions where they are sufficient to handle the anticipated loads. However, they need not be as thick as, nor as heavy or weighted as, the thicker portions of the tube. However, they need not be as thick as, nor as heavy or weighted as, the thicker portions of the tube. Hence, the tube may be materially reduced in weight since the segments act like narrow horizontal beams within the tube for handling the larger forces applied upon the axle.

Figure 10:
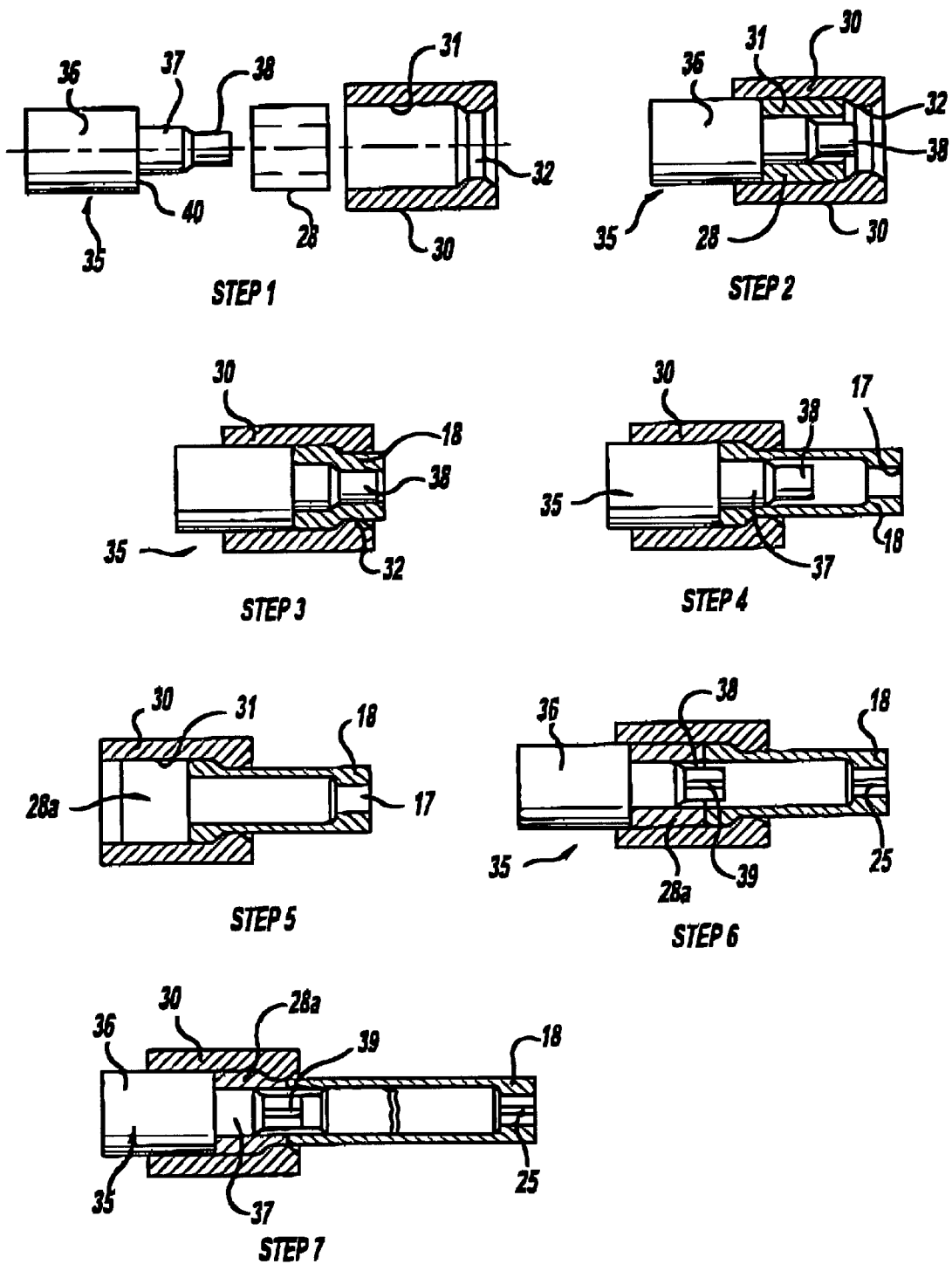
FIG. 10 schematically illustrates the successive steps in extruding the tubular center portion of the dead axle. For illustration purposes, seven sequential steps are shown.

FIG. 10 schematically illustrates the successive steps in forming the tubular center part 11. Step 1 illustrates the blank 28 and the ram 35 aligned with the die 30 at the start. Step 2 shows the blank 28 inserted within the opening 31 in the die 30. The ram 35 is inserted into the blank and the die with the shoulder 40 engaging the blank for pushing the blank through the die. Step 3 shows the ram pushing the blank through the die throat with the extension 38 positioned within the die throat 32 to form the thickened end circular portion 18. FIG. 4 shows the continuation of the movement of the ram and the extrusion of the central portion 15 of the tube. Step 5 shows the ram or punch 35 removed and another blank 28a inserted in the die against the partially extruded first mentioned blank. Step 6 shows the punch replaced in the die and located within the blank 28a. Step 7 illustrates the punch pushing the blank 28a through the die and against the blank 28 which is now pushed out of the die.

After the extrusion of the central portion 11 of the axle with the integral circular ends 18, the spindles are applied. The spindles may be manufactured elsewhere, such as by conventional casting or forging or machining metal or combinations of these methods. At that point the spindle end faces 24 are applied in face-to-face engagement with the faces 19 of the ends 18 of the tubular portion and welded thereto. The welding can be accomplished by conventional spin welding or by arc welding, or any similar suitable procedure for integrating the spindles with the ends of the tube 11.

The circumference of the completed axle is formed with hypothetical, integral segments of different thicknesses that extend along the length of the central portion of the axle. By calculating the anticipated loads and the directions of forces applied upon the axle, the axle may be oriented beneath the vehicle upon which it is mounted to best absorb the maximum forces anticipated. That is, the thicker, longitudinally extending segments may be located to absorb the heavier forces while the thinner segments are located to absorb the lesser forces. Thus, a substantial amount of the metal can be eliminated, which otherwise would be present in a uniform wall thickness tube of the conventional type.

The cross-section of the opening within the central portion of the tube may be formed in varying shapes depending upon the anticipated loads or forces which, in turn, depends upon the nature of the vehicle, the loads anticipated to be carried by the vehicle, the anticipated location of the axles beneath the vehicle, anticipated road shock forces, etc. Those skilled in the art can calculate mathematically, the dynamics of the anticipated loads or forces and the directions of the forces and from that calculate the preferred thicknesses and locations of the thick and thin segments for a particular axle. Thus, an axle can be formed for a particular type of vehicle, as for example, a trailer of a particular size and load capacity.

This invention may be further developed within the scope of the following claims.

Having fully described an operative embodiment of this invention, I now claim:

1. A non-rotatable, dead axle for a supporting vehicle, such as a truck or trailer and the like, formed of an elongated shaft of a length of substantially the width of the vehicle and having opposite end spindle portions upon which vehicle wheels may be mounted, comprising:

said shaft being formed of an extruded, one piece, metal, hollow tube portion of generally circular exterior cross-section with a central opening extending its length;

said central opening being asymmetrically curved in cross-section relative to the tube axis so that in cross-section, the wall of the tube is divided into radial segments whose thicknesses vary relatively from thin to thick, and with the segments extending substantially the full length of the tube portion;

at least one of the thick sections being adapted to be oriented to receive the greater of any forces imposed upon the axle when in use upon the vehicle; and said spindle portions being formed by separate members that are secured upon the respective ends of the tube portion in axial alignment with the tube portion.

2. A dead axle as defined in claim 1 and said tube portion having integral opposite end portions formed with the openings there through being substantially circular in cross-section and axially aligned with the axis of the tube for providing annular faces for securing the spindles thereto in face-to-face engagement with, and in axial alignment with, the central axis of the tube.

3. A dead axle as defined in claim 1, and with the opening in the tube portion being substantially oval in cross-section to form at least four integral curved segments, with at least two of the segments being diametrically opposite to each other and being thicker than the other segments.

4. A dead axle as defined in claim 1 and including said thick segments normally being arranged in use as longitudinally extending upper and lower parts of a horizontally oriented axle, and the thin segments normally being oriented to form longitudinally extending side parts of the axle when the axle is secured to a vehicle.

5. A dead axle as defined in claim 3 and including integrally formed markers on the tube for visually orienting the thick and thin segments thereof in relationship to the vehicle upon which the axle is to be mounted.

6. A dead axle as defined in claim 2 and with the spindle portions being circular in cross-section with circular in cross-section openings there through, and the spindle portions being axially aligned with the respective ends of the tube portion and abutting, face-to-face, the respective ends of the tube portion; and said ends of the tube portion being of circular external cross-section and having circular in cross-section openings to form annular end surfaces that match the cross-sectional shape of the spindle portions and engage therewith for welding the spindle portions upon the end of the tube.

7. A dead axle as defined in claim 1, and including said thick segments of the tube being of different thickness' relative to each other.

8. A dead axle as defined in claim 1 and including said thin segments of the tube being of different thicknesses relative to each other and relative to the thick segments of the tube portion.

9. A dead axle as defined in claim 1 and said central opening being asymmetrically curved in cross-section to form integral, longitudinally extending segments between the wall defining the opening and the exterior surface of the tube, with said segments being of varying wall thicknesses.

10. A dead axle as defined in claim 1, and including the cross-sectional shape of the central opening in the tube being substantially elliptical in cross-section.

11. A dead axle as defined in claim 10, and said central opening being radially offset relative to the axis of the tube portion.

12. A dead axle as defined in claim 1, and with central opening being substantially circular in cross section and having a central axis that is radially offset relative to the longitudinal axis of the external surface of the wall of the tube portion.

13. A process for forming a non-rotatable, dead axle for a vehicle, such as a truck or trailer, which axle is mounted beneath the vehicle and longitudinally extends horizontally substantially the width of the vehicle and has spindle portions upon its opposite ends upon which wheels may be mounted and a central tubular portion extending between the spindle portions comprising the steps of:

arranging a tube shaped metal blank within an open, inlet end of a die formed with an inlet end, into which the blank is inserted, and a co-axial opposite end formed as a die throat through which the blank is extruded;

inserting a pusher ram, having an axially extending extension, into the die inlet end with the punch engaging against the blank, and with the ram extension closely fitted within the interior blank tube;

moving the ram in a direction towards the die throat so that the ram pushes the blank towards and through the die throat while simultaneously aligning the extension within the die throat to form an annular space between the extension and the die throat through which the blank is extruded;

extruding the blank through the annular space formed between the die throat and the extension to form the blank into a tube whose exterior wall is generally circular and whose interior wall forms an asymmetrical in cross-sectional opening having the portions defining said interior wall located at varying radial distances from the central axis of the tube and of the die throat;

whereby the tube, following extrusion, is formed with integral, longitudinally extending wall segments of varying wall thicknesses;

separately forming the spindles with end faces corresponding in size and shape to the ends of the tube; and positioning the spindles against the ends of the tube and welding the adjacent faces of the tube ends and spindle ends to form the axle.

14. A process as defined in claim 13 and including forming said extension with an exterior surface that is of a non-circular asymmetrical, curved, cross-sectional shape.

15. A process as defined in claim 13 and including said extension having a circular cross-sectional shape whose central axis is radially offset relative to the axis of the ram and the die throat for forming an opening in the tube which is laterally offset relative to the axis of the tube exterior wall.

16. A process as defined in claim 13 and including forming the ram extension in an asymmetrical, approximately elliptical cross-sectional shape to form a varying wall thickness of the tube extruded through the die throat.

17. A process as defined in claim 13 and including forming the cross-section of said extension in a series of varying length arcs relative to the center line of the ram and the die throat and extruding the tube between the extension and die throat into integral circumferential segments of varying length and curvature and wall thicknesses to provide multiple, integral, longitudinally extending tube segments of different thicknesses.

\* \* \* \* \*